J. H. JONES & R. EMERSON.
Harvester.
No. 228,359.
3 Sheets—Sheet 2.
Patented June 1, 1880.
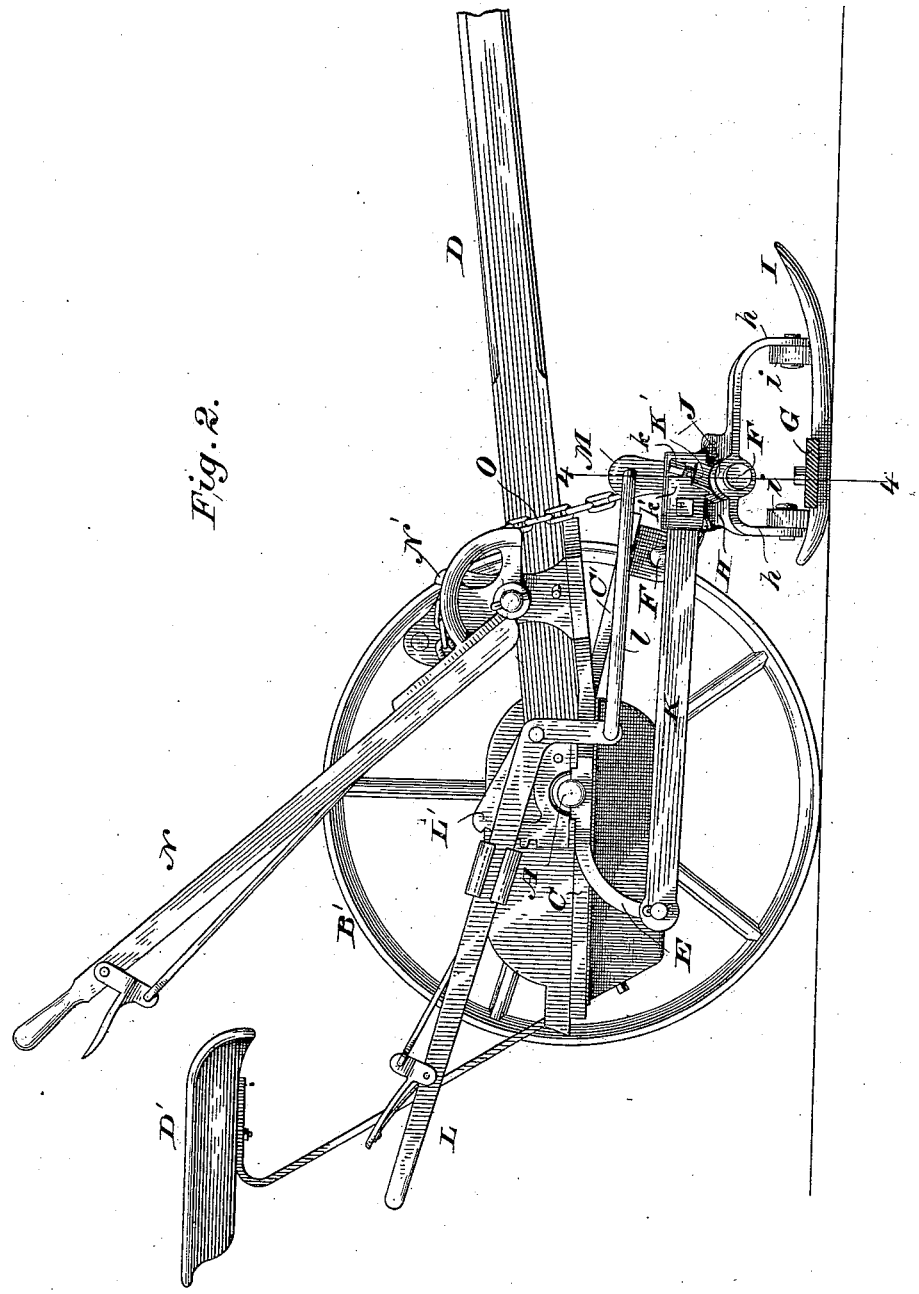
WITNESSES
Wm A. Skinkle
R. F. Barnes
INVENTORS
J. Herva Jones.
Ralph Emerson.
By their Attorneys
Baldwin, Hopkins & Peyton

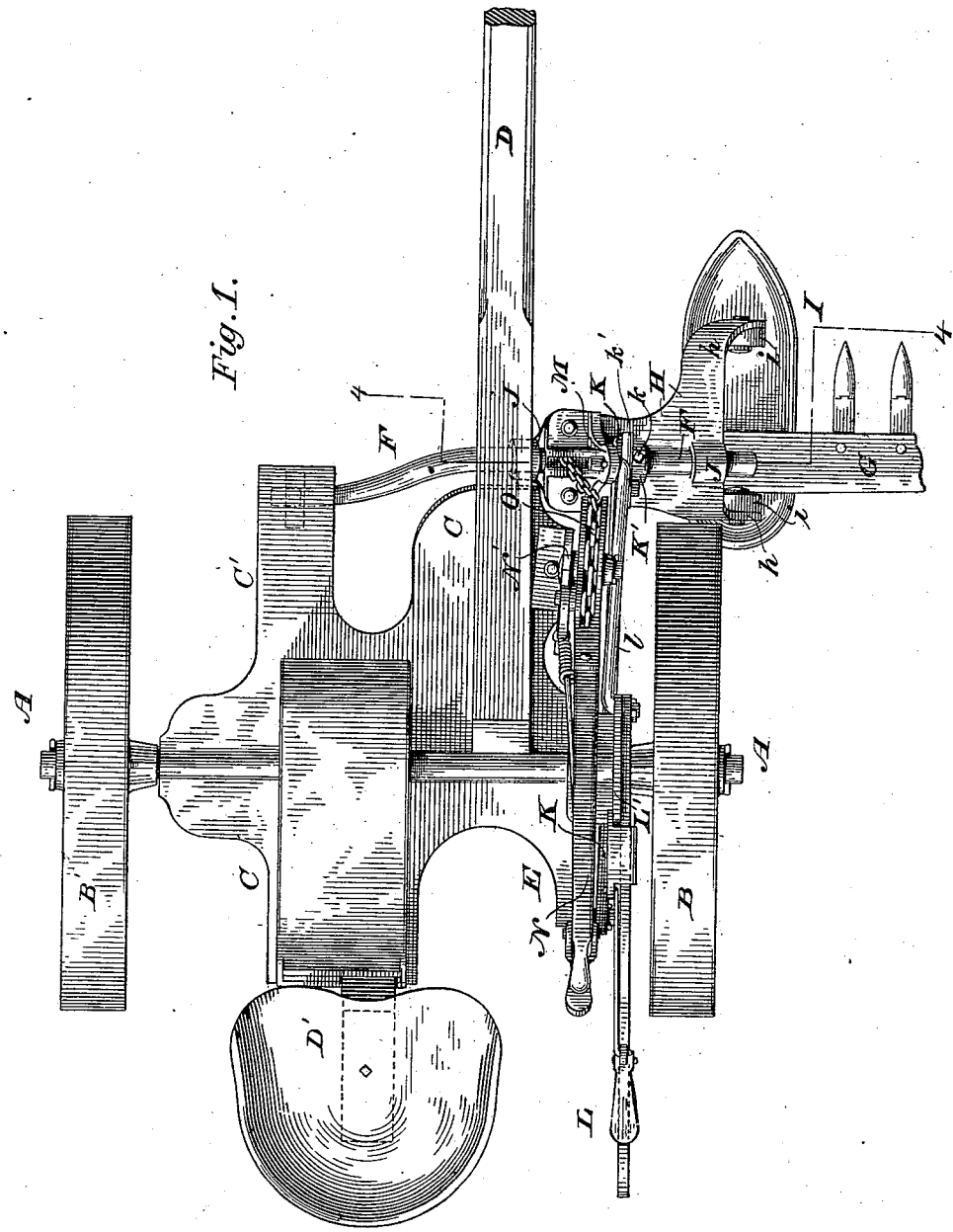

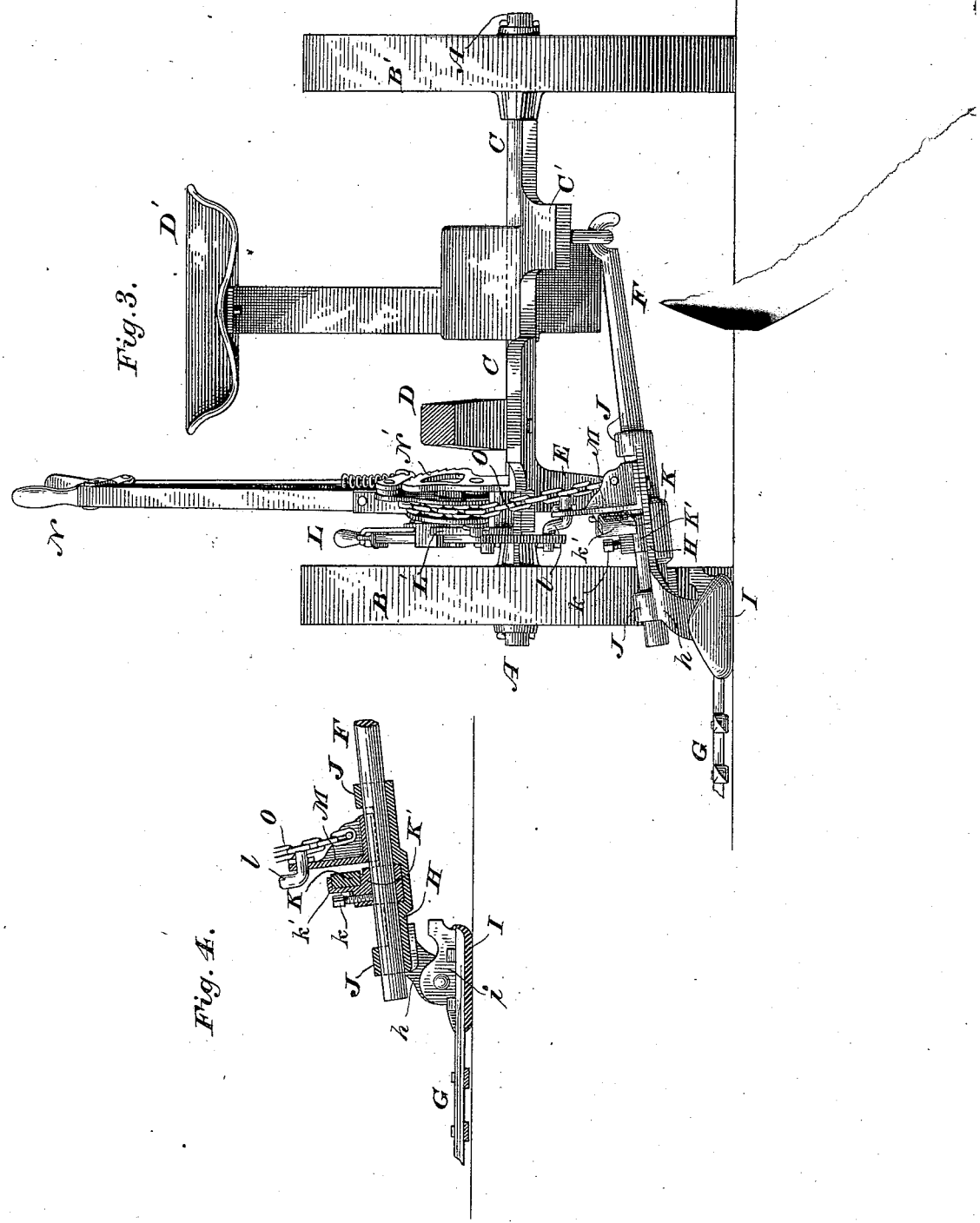

UNITED STATES PATENT OFFICE.

JAMES H. JONES AND RALPH EMERSON, OF ROCKFORD, ILLINOIS, ASSIGNORS TO EMERSOM, TALCOTT & CO., OF SAME PLACE.

HARVESTER.

SPECIFICATION forming part of Letters Patent No. 228,359, dated June 1, 1880.

Application filed February 9, 1880.

*To all whom it may concern:*

Be it known that we, JAMES HERVA JONES and RALPH EMERSON, both of Rockford, in the county of Winnebago and State of Illinois, have invented certain new and useful Improvements in Harvesters, of which the following is a specification.

Our invention relates to improvements in harvesters of the class in which the finger-beams are adapted to be rocked about their longitudinal axes; and our object is to improve the connections between the cutting apparatus and main frames of machines of this class in such manner as to render them cheap, durable, and simple in operation.

Our improvements consist in a novel organization of parts and in certain combinations of devices, hereinafter first fully described, and then specifically designated by the claims.

In the accompanying drawings we have shown only so much of a machine as deemed necessary to illustrate our improvements, which are represented as embodied in a two-wheeled front-cut mower, resembling in some features the machine shown by United States Letters Patent No. 218,534, of August 12, 1879.

Figure 1 is a plan or top view; Fig. 2, a side elevation, with the inner wheel removed and the finger-beam in section; Fig. 3, a front elevation; and Fig. 4, a view, partly in front elevation and partly in vertical section on the lines 4 4 of Figs. 1 and 2, showing the connections between the coupling-arm and cutting apparatus.

The main axle A, wheels B B', main frame C, with a forwardly and downwardly extending arm or corner projection, C', tongue D, driver's seat D', downhanger or brace attaching arm E, and all other parts which it is deemed unnecessary to particularly describe herein, are, unless it is hereinafter otherwise stated, preferably the same, or substantially similar to the corresponding parts shown in the before-mentioned Patent No. 218,534, to which patent reference is made for descriptions of features here omitted and for a full understanding of details of construction which have no necessary or intimate connection with the invention claimed by us.

A round coupling-arm, F, is hook-jointed or otherwise suitably connected at its inner end with the main frame, so that it may be vibrated vertically about its connection therewith. The arm is bent outwardly or curves forwardly slightly from its point of attachment to the main frame beneath the arm C' thereof for a portion of its length—say one-third—and then continues straight. At its outer or straight portion the coupling-arm is located in about the plane of the finger-beam G— that is to say, the finger-beam and outer part of the coupling-arm are in a common vertical plane, or substantially so.

Obviously the coupling-arm might be made straight throughout by extending the frame-arm C' farther forward. It might be made with a downward bend at its inner end, so as to bring its connection with the main frame higher above the ground, as well as to lessen the declination of the outer part of the arm, leaving it substantially horizontal when in ordinary working position.

The cutting apparatus is connected with the coupling-arm, so that it may be rocked transversely to the arm—that is, the cutting apparatus may be turned about its longitudinal axis—while similar rocking of the arm is prevented in the manner to be described.

In lowering and elevating the cutting apparatus it vibrates with the coupling-arm about the heel or inner end of the latter.

In connecting the cutting apparatus and coupling-arm, and in securing the latter against movement other than that of vertical vibration about its heel end, we employ and organize devices as now to be described.

A rocking frame, yoke, or forked bracket, H, is pivoted, by its forks or arms *h h*, to lugs *i i* on a shoe, I, with which the finger-beam is connected in the usual way. Bearings J J on this frame, yoke, or bracket H fit upon the coupling-arm, so that the bracket may turn or rock on the arm. A long half-bearing or longitudinal groove, semicircular in cross-section, is also provided to receive the coupling-arm.

A push-bar or brace-arm, K, pivoted at its rear end to the frame-arm or downhanger E, is detachably connected at its front end with a lug or collar, K', on the coupling-arm, and projecting above the yoke or bracket intermediate to the bearings J J. The collar K' is secured on the coupling-arm by a set-screw, k.

The brace-arm is secured to the collar by means of a rearwardly-projecting flanged arm or socket-piece, k', thereon and a bolt passing through the brace-arm and socket-piece. When properly adjusted and secured thereto the brace-arm prevents rocking movement of the coupling-arm about its longitudinal axis, while leaving the cutting apparatus free to be rocked to tip the guards for raising or lowering their points by turning the coupling-arm frame or bracket H directly about the round coupling-arm. A lever, L, provided with a suitable detent, engaging with a rack, L', and connected at its cranked lower end, by a link, l, with the top of a post or upright, M, on the rocking frame or bracket H, serves to turn this bracket on the coupling-arm and to lock it in the desired position.

The post M is bolted by its flanged base to the rocking bracket H, and is grooved for the coupling-arm.

A lever, N, provided with a detent and a holding-rack, N', connects, by a cord or chain, O, with the post M, near its base and between flanges thereon, and serves to raise and lower the cutting apparatus by vibrating the coupling-arm about its jointed connection with the main frame.

From the description above it will readily be understood that the shoe, finger-beam, &c., may be tilted or rocked about the coupling-arm as a pivot as well when the cutting apparatus is raised somewhat for high cut as when at its lowest working position.

The limited vertical play of the cutting apparatus about its shoe-connections with the bracket or rocking frame prevents any cramping or binding of the bracket when being rocked on the inclined coupling-arm—that is to say, the cutting apparatus plays sufficiently about the shoe-pivots to be self-accommodating in its movements, so as to guard against too great pressure downward of the outer end of the beam as the rocking frame or bracket turns about the non-turning, slightly-inclined coupling-arm, which obviously need not be round inside of that portion about which the rocking frame or bracket turns, although we prefer to make the arm round throughout and of gradually-decreasing size from the inner bearing, J, of the rocking frame to the main frame connection.

The coupling-arm F and the brace-arm or push-bar K together make up a strong and rigid vibrating frame for flexibly connecting the cutting apparatus to the main frame at the two points shown. In raising and in rocking the finger-beam, &c., by means of this angular coupling-frame F K and the levers N L and their connections the desired movements may positively be imparted, as there is no play of the push-bar upon or about the coupling-arm.

An important advantage of firmly attaching the push-bar to the coupling-arm and respectively jointing this arm and bar to the front corner of the outer or land side of the machine and to the rear corner of the inner or grass side of the machine is that the violent thrusts or backward strains due to the encountering of obstructions by the cutting apparatus cause the machine to "buckle" or suddenly rise at the inner side or wheel B instead of at the outer side or the wheel B', thus avoiding any possibility of throwing the driver in front of the cutters, where there is always risk of his being thrown when the outer wheel jumps suddenly by reason of shocks imparted by the encountering of stumps, &c., by the cutters.

By adjustably yet firmly securing the push-bar to the round coupling-arm, between the shoe-bearings J J and near the heel end of the finger-beam, the connection between the cutting apparatus and frame of the machine is rendered secure, and all requisite adjustments are readily admitted of.

We do not claim a round coupling-arm, nor a vibrating non-turning coupling-arm, nor one having only vertical vibratory movement about its hinged connection with the frame of the machine; nor do we broadly claim the combination of a vertically-vibrating non-turning coupling-arm and a frame or bracket supporting a shoe, finger-beam, &c., and having a turning movement about the coupling-arm. Such devices and combination are older than our invention.

We claim as of our own invention—

1. The combination of the main frame, the vertically-vibrating, non-turning, round coupling-arm jointed to the outer front corner of the main frame, the forked turning frame or bracket, hinged to the shoe and having the separated bearings fitted directly to and rocking about the outer end of the round coupling-arm, and the brace-bar, jointed at its heel end to the inner rear corner of the main frame and rigidly connected at its front end directly with the coupling-arm between the bearings of the shoe-supporting bracket, as and for the purpose described.

2. The combination of the main-frame front arm or projection, C', the brace-attaching arm E at the inner rear corner of the main frame, the vertically-vibrating coupling-arm jointed to said projection, the brace-bar jointed to its said arm, the shoe-supporting turning frame or bracket rocking about the coupling-arm, the collar and set-screw by which the brace-bar is directly and firmly, yet adjustably, secured to the coupling-arm intermediate the bearings of the turning frame thereon, the lever for rocking the guards connected with the turning frame, and the lever and its connections with the turning frame for elevating and lowering the cutting apparatus, substantially as hereinbefore set forth.

3. The combination, with the vertically-vibrating, non-turning, round coupling-arm and the brace-bar rigidly connected therewith, of the turning frame or shoe-supporting bracket H, having the separate bearings J J, by which it is fitted to and rocks directly about the coupling-arm without interfering with the direct and rigid attachment of the brace-bar to the coupling-arm, as and for the purpose described.

4. The combination of the shoe, the turning bracket, hinged to the shoe and provided with the separated bearings J J, and the post M, intermediate said bearings, the vertically-vibrating non-turning coupling-arm, directly about the rounded end of which said bracket is fitted to rock by its bearings, the vertically-vibrating brace-bar, directly and firmly connected with the coupling-arm intermediate the bracket-bearings, the lever N, the lever L, and connections between these levers and the post on the bracket, substantially as hereinbefore set forth.

In testimony whereof we have hereunto subscribed our names.

JAMES HERVA JONES.
RALPH EMERSON.

Witnesses:
JNO. W. HEPBURN,
S. G. BRONSON.